(12) United States Patent
Jones et al.

(10) Patent No.: US 10,164,451 B2
(45) Date of Patent: Dec. 25, 2018

(54) SHOPPING CART POWER GENERATION

(71) Applicant: Walmart Apollo, LLC, Bentonville, AR (US)

(72) Inventors: Matthew Allen Jones, Bentonville, AR (US); Nicholaus Adam Jones, Rogers, AR (US); Robert James Taylor, Rogers, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 80 days.

(21) Appl. No.: 15/410,185

(22) Filed: Jan. 19, 2017

(65) Prior Publication Data
US 2017/0214262 A1    Jul. 27, 2017

Related U.S. Application Data

(60) Provisional application No. 62/287,656, filed on Jan. 27, 2016.

(51) Int. Cl.
| *H02J 7/00* | (2006.01) |
| *H02J 7/02* | (2016.01) |
| *H02J 7/14* | (2006.01) |
| *B62B 3/14* | (2006.01) |

(52) U.S. Cl.
CPC .......... *H02J 7/0044* (2013.01); *H02J 7/0052* (2013.01); *H02J 7/0054* (2013.01); *H02J 7/02* (2013.01); *H02J 7/1407* (2013.01); *B62B 3/14* (2013.01); *B62B 3/1424* (2013.01); *H02J 2007/0062* (2013.01)

(58) Field of Classification Search
USPC ....................................................... 320/114
See application file for complete search history.

(56) References Cited

U.S. PATENT DOCUMENTS

| 7,225,980 | B2 | 6/2007 | Ku et al. |
| 7,350,607 | B2 | 4/2008 | Park et al. |
| 7,562,729 | B2 | 7/2009 | Hammerle |
| 8,120,190 | B2 | 2/2012 | Bravo |
| 8,820,447 | B2 | 9/2014 | Carter et al. |
| 2006/0249320 | A1* | 11/2006 | Carter ............. A47F 10/04 180/65.51 |
| 2007/0090702 | A1* | 4/2007 | Schiller ............. A45C 5/14 310/75 C |

(Continued)

FOREIGN PATENT DOCUMENTS

| CN | 203974876 U | 12/2014 |
| JP | 2010024999 A | 9/2010 |

OTHER PUBLICATIONS

"Eco Gadgets: E~Cart aims to power a supermarket by harnessing kinetic energy," EcoFriend.com, ESHI Internatoan PTE Ltd, first accessed Nov. 6, 2015; 5 pages.

*Primary Examiner* — Mohammed Alam
(74) *Attorney, Agent, or Firm* — Schmeiser, Olsen & Watts LLP

(57) ABSTRACT

A shopping cart that generates power, and comprising a shopping cart body; a set of wheels that each rotates about an axle coupled to the shopping cart body; a power generator that generates a source of power from a rotational force of the wheels when a user moves the shopping cart; a voltage regulator that controls the source of power output from the power generator; and an outlet for outputting the controlled power to an electronic device.

18 Claims, 6 Drawing Sheets

(56) References Cited

U.S. PATENT DOCUMENTS

| | | | |
|---|---|---|---|
| 2009/0315302 A1* | 12/2009 | Gray | B60B 33/0028 |
| | | | 280/727 |
| 2010/0078903 A1* | 4/2010 | Bravo | H02J 17/00 |
| | | | 280/33.992 |
| 2016/0063534 A1* | 3/2016 | Aziz | G06Q 30/0238 |
| | | | 705/14.38 |
| 2017/0214262 A1* | 7/2017 | Jones | H02J 7/0044 |
| 2017/0229903 A1* | 8/2017 | Jones | H02J 7/1407 |

* cited by examiner

SHOPPING CART POWER GENERATION

RELATED APPLICATIONS

This application claims priority to U.S. Provisional Patent Application No. 62/287,656, filed Jan. 27, 2016 and entitled "Shopping Cart Power Generation," the entirety of which is incorporated by reference herein.

FIELD

The present inventive concepts relate generally to shopping carts having power generating capabilities, and more specifically, to systems and methods for using power generation from a shopping cart to provide power to customer devices.

BACKGROUND

Retail establishments offer services for shoppers that require use of the shopper's mobile devices, display devices affixed to the shopping carts, and/or other portable electronic devices. However, such devices require electrical power, and it is often difficult for a shopper to find electrical power outlets for recharging these devices.

BRIEF SUMMARY

In one aspect, provided is a shopping cart that generates power, comprising: a shopping cart body; a set of wheels that each rotates about an axle coupled to the shopping cart body; a power generator that generates a source of power from a rotational force of the wheels when a user moves the shopping cart; a voltage regulator that controls the source of power output from the power generator; and an outlet for outputting the controlled power to an electronic device.

In some embodiments, the shopping cart further comprises a storage device that stores the controlled power from the voltage regulator, wherein the electronic device receives the controlled power from the storage device.

In some embodiments, the storage device is a battery or capacitor.

In some embodiments, the storage device is positioned at a handle of the shopping cart.

In some embodiments, the shopping cart further comprises a charging port to which the electronic device is electrically coupled for receiving the controlled source of power via the storage device.

In some embodiments, the shopping cart further comprises a switching device that exchanges power between the storage device and one or more power sources.

In some embodiments, when the power source provides external power, then the switch forms a circuit, wherein the storage device receives power, instead of receiving power from the power generator.

In some embodiments, the switch forms a circuit when the power generator generates power.

In some embodiments, the switching device regulates power levels in shopping carts coupled to the shopping cart in a daisy chain configuration.

In some embodiments, the shopping cart further comprises a charging port to which the electronic device is electrically coupled for receiving the controlled power directly from the voltage regulator. In some embodiments, the charging port includes a universal serial bus (USB) port.

In some embodiments, the shopping cart further comprises a docking connector that is daisy-chained to one or more docking connectors of neighboring shopping carts for providing the controlled power to storage devices of the neighboring shopping carts using an external power source.

In some embodiments, the electronic device includes a display screen attached to the shopping cart.

In some embodiments, the electronic device includes a smartphone that is charged when coupled to a USB port receiving the controlled power.

In another aspect, provided is a method for generating power using a shopping cart comprises coupling a power generator to a shopping cart body; moving the shopping cart so that a set of wheels rotatably affixed to the shopping cart body rotate; generating a source of power from a rotational force of the wheels when the wheels rotate; controlling the source of power output from the power generator; and providing the controlled power to an electronic device.

In another aspect, provided is a shopping cart, comprising: a shopping cart body; a set of wheels that each rotates about an axle coupled to the shopping cart body; a power generator that generates a source of power from a rotational force of the wheels when a user moves the shopping cart; and a storage device that stores the generated power from the voltage regulator for use by an electronic device.

In some embodiments, the storage device includes a positive connection point and a negative connection point that form an electrical connection with a storage device of another shopping cart coupled to the shopping cart in a daisy-chain configuration.

BRIEF DESCRIPTION OF THE SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts.

DETAILED DESCRIPTION

Provided in some embodiments is a shopping cart or related movable device for transporting items between locations, which includes an electric charge circuit that generates a voltage in response to a rotational movement of the wheels of the shopping cart, and that uses the generated voltage to charge mobile devices, such as a scan-and-go device, smartphone, laptop, display screen, and so on. The shopping cart includes a universal serial bus (USB) port or the like for charging an electrical connection to an electronic device or the like directly from the power generator or from a battery, capacitor, or other charge storage device. In some embodiments, a plurality of shopping carts are connected to each other in a daisy-chain configuration, so that the batteries on the attached carts can be charged by a shopping cart at the end of the chain, which receives power from a source of power, and it in turn powers the other carts in the chain.

In some embodiments, the systems and methods may apply to a cart pusher, or a vehicle that pushes a series of carts around a parking lot. An operator, for example, a store associate can use the cart pusher to retrieve the cart and dock it into other carts to push them back together to the store. A powered cart pusher may include a rechargeable battery for moving or otherwise powering the cart pusher, which may have a larger battery, and may charge or recharge a shopping cart having an electric charge circuit in accordance with some embodiments.

An attachment to a motorized customer cart may provide reserve power for carts having batteries that are dead, but can be restored by a charge provided by the motorized customer cart. In some embodiments, a shopping cart including a USB port or the like allows a customer to power a smartphone or other electronic device without draining the battery on the cart.

Figure 1:
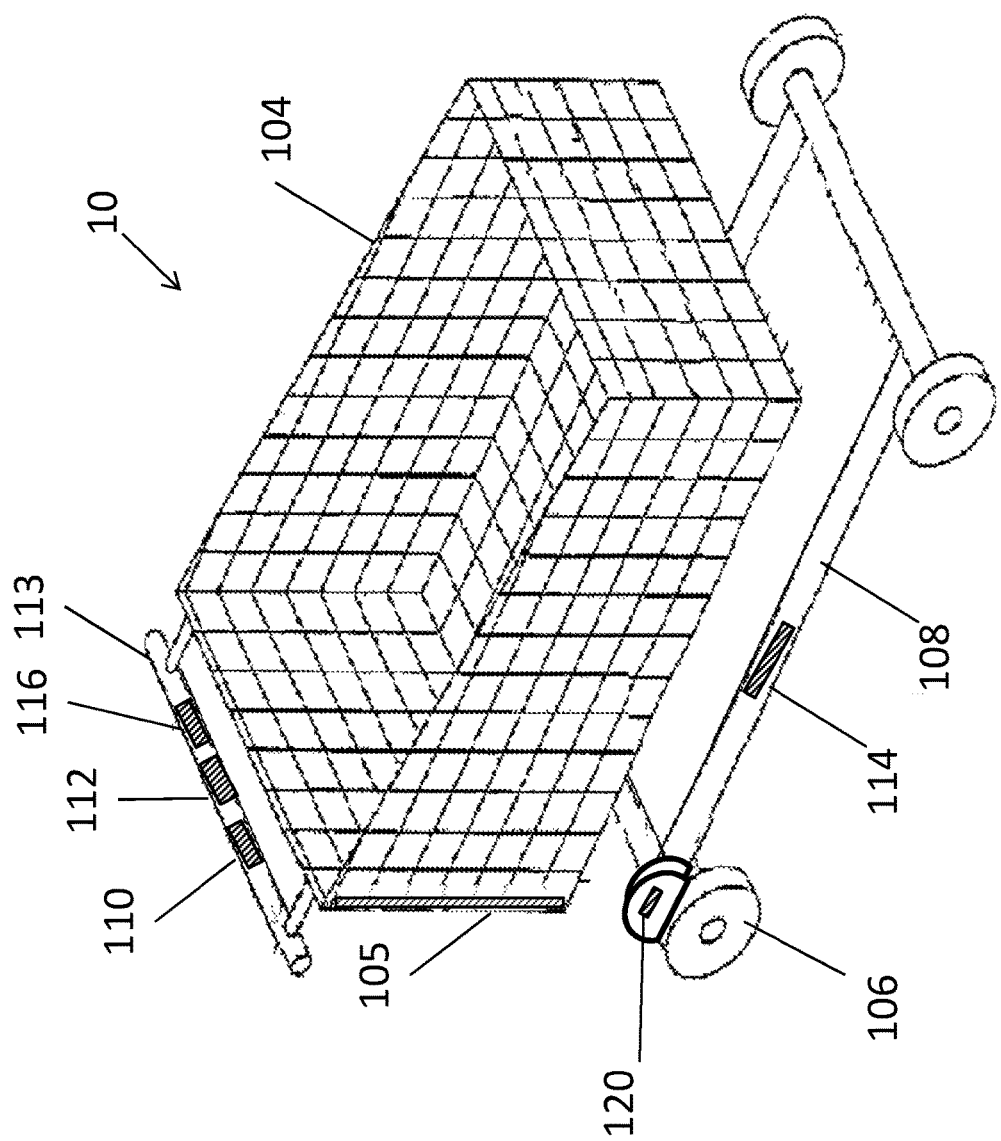
FIG. 1 is a perspective view of a shopping cart configured to include a power source, in accordance with some embodiments.

FIG. 1 is a perspective view of a shopping cart 10 configured to provide a source of power, in accordance with some embodiments.

The shopping cart 10 may include well-known components such as a handle 113, basket 104, wheels 106, and base 108. As is well known, a rotating wheel 106 can provide mechanical energy in the form of rotational energy. Accordingly, a portion of a wheel's rotational energy into electrical energy that can be used to power other systems, components, and devices on the shopping cart 10. Other movements may equally apply for generating a voltage or electric charge, such as a sliding lateral movement. The shopping cart 10 includes a power generator 120 that uses at least a portion of the rotational energy of at least one wheel 106 to produce energy, more specifically, a voltage, that can be processed by the power generator 120 to provide direct power to a storage device, such as a battery or capacitor, for example, located at the handle 113 (see FIG. 2). More specifically, the power generator 120 can be a direct current voltage generator, and include other generators, such as charge generators, Van de Graaf generators, or related devices that generate a voltage or electric charge. As used herein, the term "generator" is a broad term, and is used in its ordinary sense, and includes without limitation, unless explicitly stated, an apparatus that converts mechanical energy into electromagnetic energy. A generator includes, but is not limited to, a dynamo or an alternator. A generator may produce a direct current (DC) and/or an alternating current (AC). Mechanical energy includes, but is not limited to, kinetic energy, and in some embodiments, rotational kinetic energy. In certain preferred embodiments, a generator produces electrical power from a portion of the mechanical energy of one or more rotating wheels.

In certain embodiments, the generator 120 is in electrical communication with an electrical energy storage device 116, which stores the electrical energy for use when the generator 120 is not producing electricity. The electrical storage device 116 can comprise one or more capacitors, rechargeable batteries, or other suitable devices for storing electrical energy.

Figure 2:
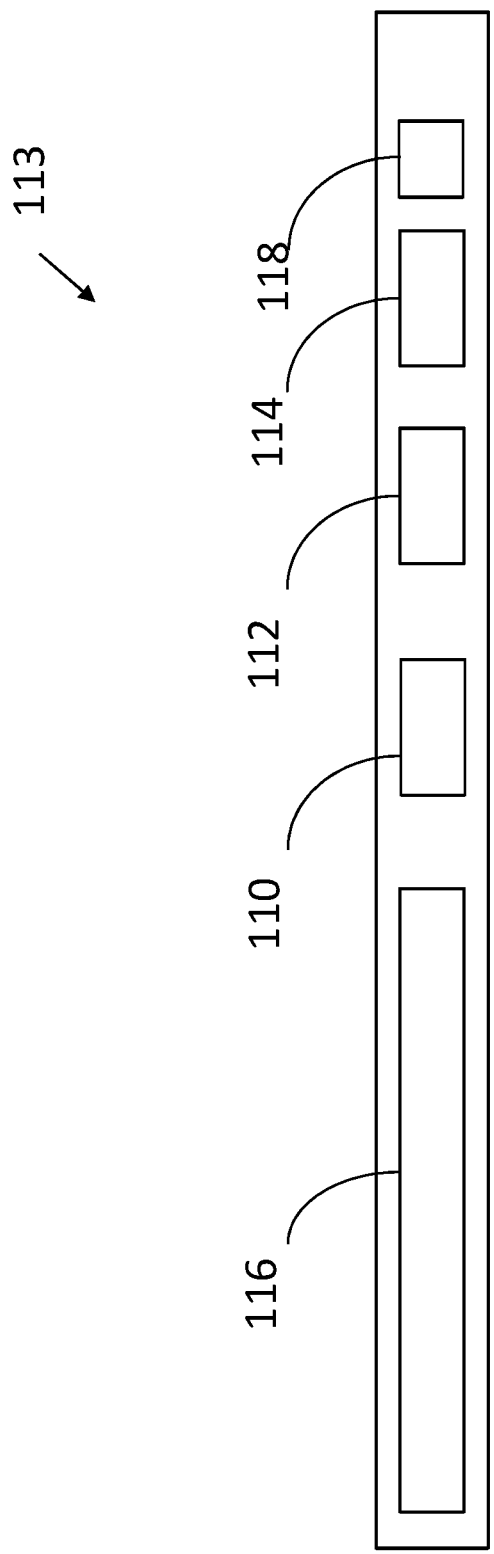
FIG. 2 is a cross-sectional view of a shopping cart handle, in accordance with some embodiments.

FIG. 2 is a cross-sectional view of a shopping cart handle 113, in accordance with some embodiments. Referring again to FIG. 1, the electrical storage device 116, a phone connector 110 USB port 112, a docking interface 114, and/or a plug 118 may be located at the handle 113 of a shopping cart 10. In other embodiments, as shown in FIG. 2, one or more of the electrical storage device 116, phone connector 110, USB port 112, a docking interface 114, and/or plug 118 are positioned in a cart rail 105, the base 108, the basket 104, or other location of the shopping cart 10. For example, referring again to FIG. 1, a docking interface 114 may be at the shopping cart base 108, and separate from but in electrical communication with the electrical storage device 116, a phone connector 110, USB port 112, and/or plug 118.

In some embodiments, the phone connector 110 and USB port 112 are the same. In other embodiments, the phone connector 110 and USB port 112 are different. For example, the phone connector 110 may include a proprietary interface to the connector socket of a mobile electronic device for providing the mobile electronic device with electric power for charging a battery in the mobile electronic device and/or other circuits of the mobile electronic device. Examples may include but not be limited to an Apple™ 30 pin connector, Apple™ lightning connector, mini-USB, micro USB, and the like.

The docking interface 114 provides an upstream connection and/or downstream "daisy-chain" connection with a similar interface on another shopping cart or neighboring apparatus having an electrical storage device. A conductive cable or the like can be removably coupled or permanently attached to the docking interface so that electricity produced at the electrical storage device 116 and/or AC power received from the connector plug 118 can be output from the docking interface 114 through the conductive cable to a docking interface or other coupling for charging a battery, capacitor, or other storage device on the neighboring apparatus.

In some embodiments, the docking interface 114 may be used for powering a plurality of shopping carts 10 electrically connected together, for example, in a daisy-chain configuration. The docking interface 114 may each receive power from an external power source, for example, a wall outlet, and/or receive power from an end cart which via the docking interface 114.

Figure 6:
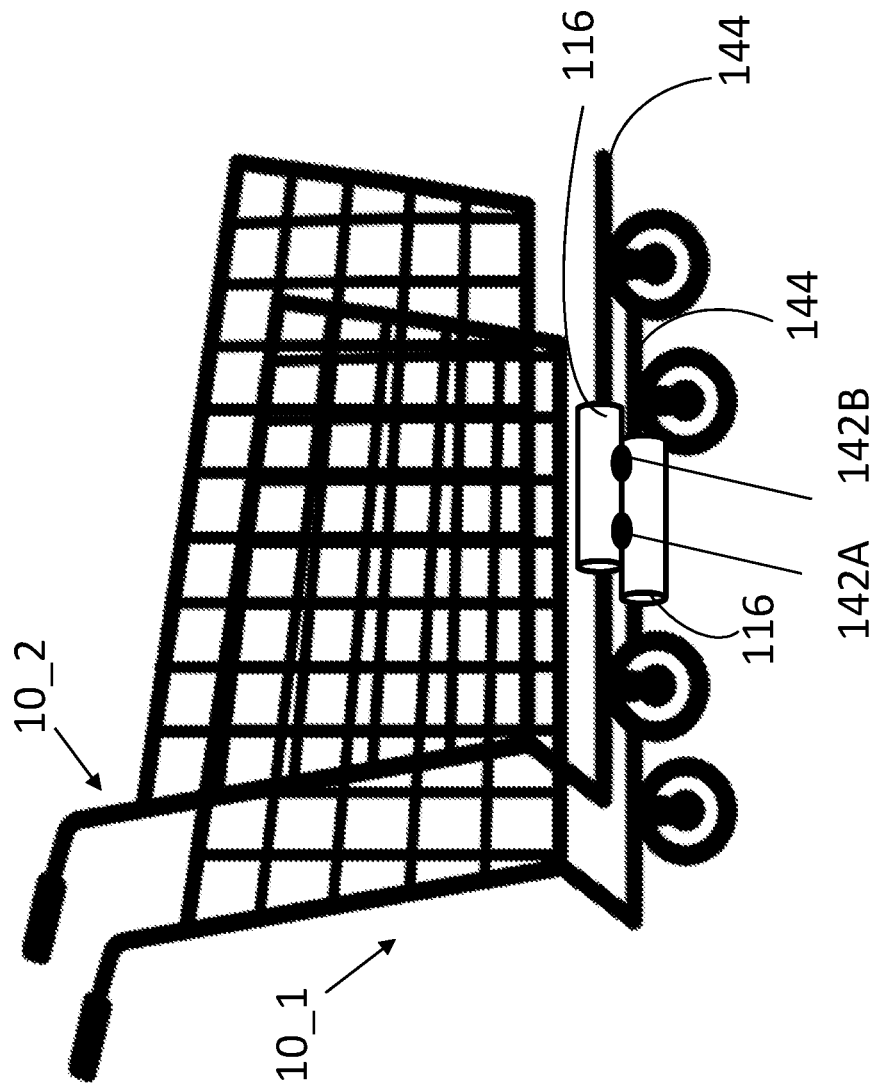
FIG. 6 is a side view of two shopping carts coupled to each other, in accordance with some embodiments.

For example, as shown in FIG. 6, two shopping carts 10_1, 10_2 (generally, 10) can each have a storage device 116, such as a capacitor located on a bottom rail 144 of the corresponding shopping cart 10. Each storage device 116 may have a positive connection point 142A and a negative connection point 142B. When the two carts 10_1, 10_2 are coupled together, for example, in a well-known coupling arrangement at retail stores, the positive and negative connections 142A, 142B of the storage device 116 of the first cart 10_1 form an electrical connection with the positive and negative connections 142A, 142B of the storage device 116 of the second cart 10_2.

In some embodiments, the shopping cart 10 includes two docking interfaces 114: one for receiving power from another shopping cart upstream from the shopping cart 10 and another for outputting power to another shopping cart downstream from the shopping cart 10. As described herein, the shopping cart 10 can therefore charge its electrical storage device 116 from either AC power from a power grid or related source, i.e., via a wall jack, or from a cart pusher, which may have a larger battery than the shopping carts. In some embodiments, a smartphone or other electronic device coupled to the phone connector 110 or USB port 112 is charged by the battery or power source 116 of another shopping cart in electrical communication with the shopping cart 10 by the docking interface 114. For example, the USB port 112 may be configured as a multipurpose adaptor with a USB connector for charging batteries of various portable electric apparatuses, for example, a smartphone, laptop computer, navigation device, and so on. A device coupled to the USB port 112 may draw power from the shopping cart battery and/or an external power source.

In some embodiments, when charging a shopping cart, the connector plug 118 connects to an electrical outlet that supplies AC power, for example, 120 volts. A power cable (not shown) can connect power from the connector 110 to an AC/DC converter (not shown), which converts that AC power to DC for charging the electrical storage device 116. For example, the connector plug 18 can be inserted into a connector socket of a smartphone to charge the battery therein. Power received via the connector plug 18 can be output via the docking interface 114 to an electrical storage device of one or more other shopping carts electrically coupled to the shopping cart 10, for example, daisy-chained as described above.

Figure 3:
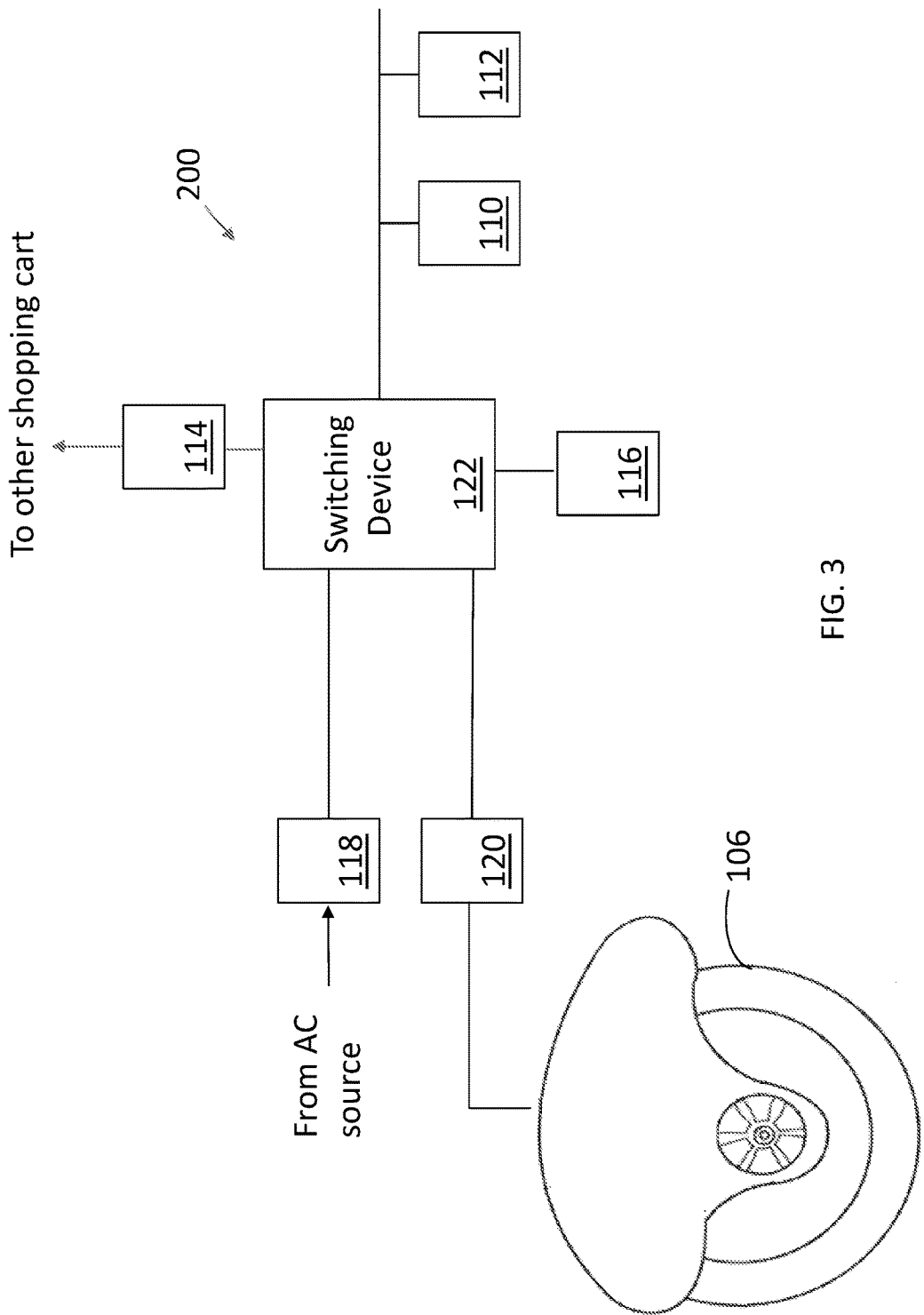
FIG. 3 is a block diagram of a system for providing electricity in a shopping cart, in accordance with some embodiments.

FIG. 3 is a block diagram of a system 200 for providing electricity in a shopping cart, in accordance with some embodiments. The system 200 can be implemented in a shopping cart, such as the shopping cart 10 illustrated in FIGS. 1 and 2.

As shown in FIG. 3, the system 200 can process electricity generated and/or received from one or two different sources. One source is described above in FIG. 1, namely, a power generator 120 that uses at least a portion of the rotational energy of at least one wheel 106 of the shopping cart 10 to produce energy. More specifically, the power generator 120 may be integrated into the wheel 106, and may produce electricity through relative motion between one or more magnets 170 and one or more coils comprising wire windings or lap winding core 168, thereby inducing electricity (e.g., voltage and/or AC and/or DC current) when magnets 170 or related field poles rotate with respect to lap winding core 168, generating a current in lap winding core 168, which current generates an electric charge or voltage. The motion of one or more magnets 170 disposed on the rotor induces electrical power in the windings 168 disposed on the stator. Also provided is a brush 166. In other embodiments, the magnets 170 are disposed on a stator, and the coils 168 are disposed on a rotor. The magnets 170 can be permanent magnets and/or electromagnets. Many generator variations are possible, as is well known in the electrical arts. In embodiments adapted for use in wheeled objects, one or more generators are disposed in or on the object and mechanically coupled to one or more wheels 106 so that electrical power is generated when the wheels turn. The power generator 120 may include other elements well-known but not shown such as rectifiers and the like.

The other source of power may be AC power received via the connector plug 118 that allows the shopping cart 10 to be connected to an alternating current (AC) power supply, for example, a wall socket.

In some embodiments, the electrical storage device 116 may be charged by an output of the power generator 120. Voltage regulators, capacitors, switches, or related elements may be positioned between the power generator 120 and the electrical storage device 116 for regulating or otherwise providing a sufficient electric charge to the electrical storage device 116.

In some embodiments, the electrical storage device 116 may be charged by an output of the connector plug 118. Voltage regulators, rectifiers, converters, capacitors, switches, or related elements may be positioned between the power generator 120 and the electrical storage device 116 for regulating or otherwise providing a sufficient electric charge to the electrical storage device 116.

As shown in FIG. 3, the phone connector 110, USB port 112 and/or docking interface 114 can receive power (e.g., voltage, current) from the electrical storage device 116, the power generator 120, the AC connector plug 118, or a combination thereof. A switching device 122 can exchange power between the electrical storage device 116 and one or more power sources 118, 120. If external power is applied, then the switch 116 permits a circuit to be formed, whereby the electrical storage device 116 may receive power, instead of receiving power from a generator 120 receiving power produced by a rotational motion of the shopping cart wheel 106. The switch 122 may form another circuit when the generator 120 is generating power. In some embodiments, the switching device 122 can be used to level the carts 10 in a daisy chain configuration, described herein. For example, referring to FIGS. 4-6, if another cart 10_2 is coupled to a shopping cart 10_1 having the switching device 10, power can flow via a docking interface 114 to the other cart 10_2. The switch 122 may determine whether to send the excess energy to a next cart if required.

Figure 4:
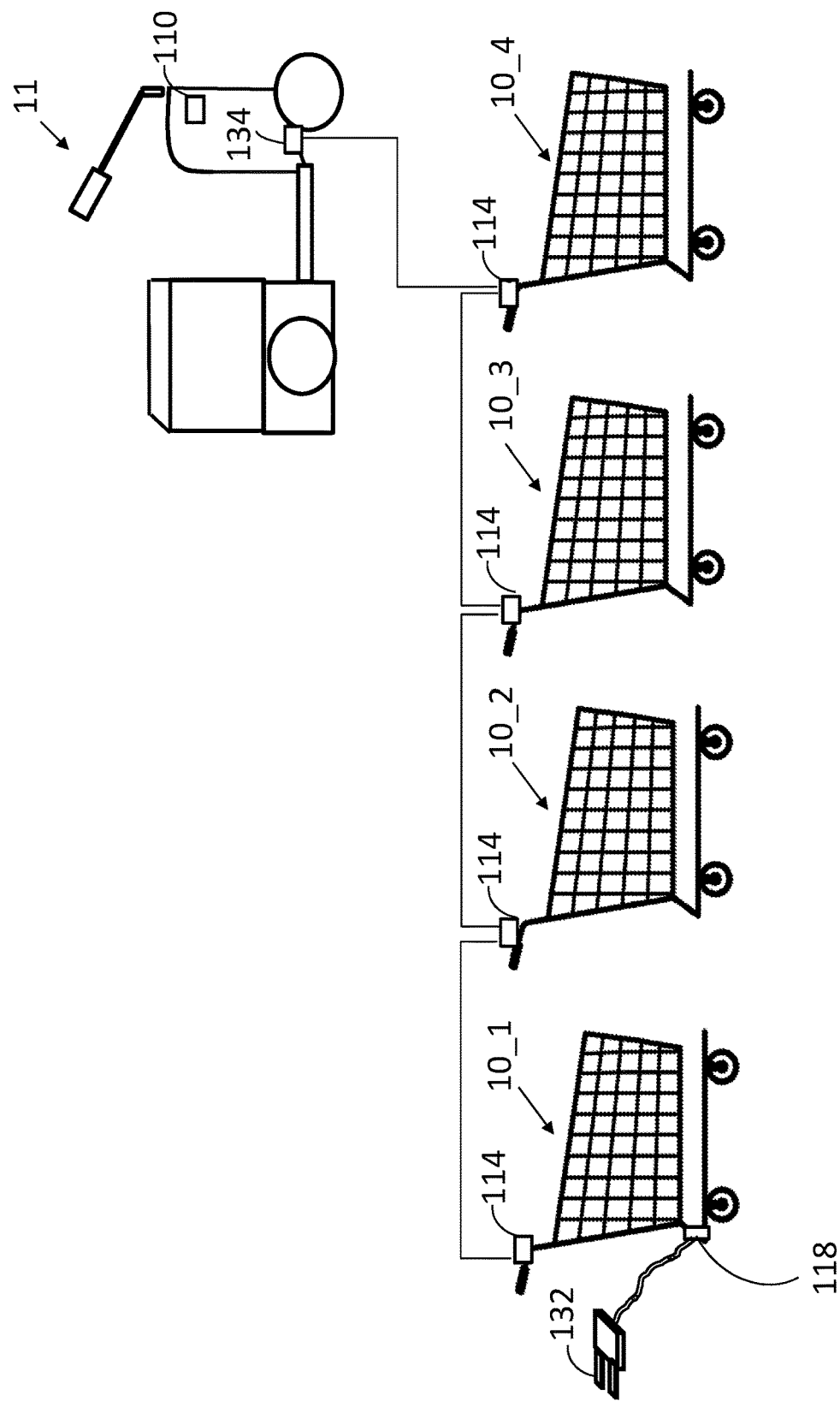
FIG. 4 is a diagram of a plurality of shopping carts in electrical communication with each other and a motorized cart in a daisy chain configuration, in accordance with some embodiments.

FIG. 4 is a diagram of a plurality of shopping carts 10_1-10_4 (generally, 10) in electrical communication with each other in a daisy chain configuration, in accordance with some embodiments.

A distalmost or end cart 10_1 has a plug 132 that can be inserted into an AC power receptacle, and provide power received from the power receptacle to the AC connector plug 118. The AC connector plug 118 can charge electrical storage devices (not shown) at the end cart 10_1. In addition, or alternatively, the AC connector plug 118 can provide power received from the AC connector plug 118 and/or electrical storage device (not shown) to a neighboring shopping cart 10_2 via a connector between the docking interface 114 of the end cart 10_1 and the neighboring cart 10_2. In some embodiments, the neighboring cart 10_2 is an intervening cart positioned between the end cart 10_1 and a neighboring cart 10_3, and provides power received from the end cart 10_1 to the neighboring cart 10_3. Cart 10_2 may also provide power from a battery and/or external AC source to the neighboring cart 10_3. Similarly, cart 10_4 at the end of the daisy chain may receive power from cart 10_3. Accordingly, carts 10_1 to 10_4 electrically connected to each other via connectors between docking interfaces 114 may each include batteries or the like that can all be charged from the AC connector plug 118 at the end cart 10_1.

In some embodiments, the cart pusher 11 may include a battery similar to or the same as those of the shopping carts 10, or a battery larger than those of the shopping carts 10. Any of the carts 10_1-10_4, 11 can receive power from another source as described herein and can therefore charge, i.e., battery 116, while docked. The cart pusher 11 may include a docking interface 134 similar to or the same as a docking interface 114 of a shopping cart 10. This attachment 114 may permit reserve power stored a charging device such as a battery or the like (not shown) to be used for charging dead carts 10, i.e., carts having drained batteries.

Figure 5:
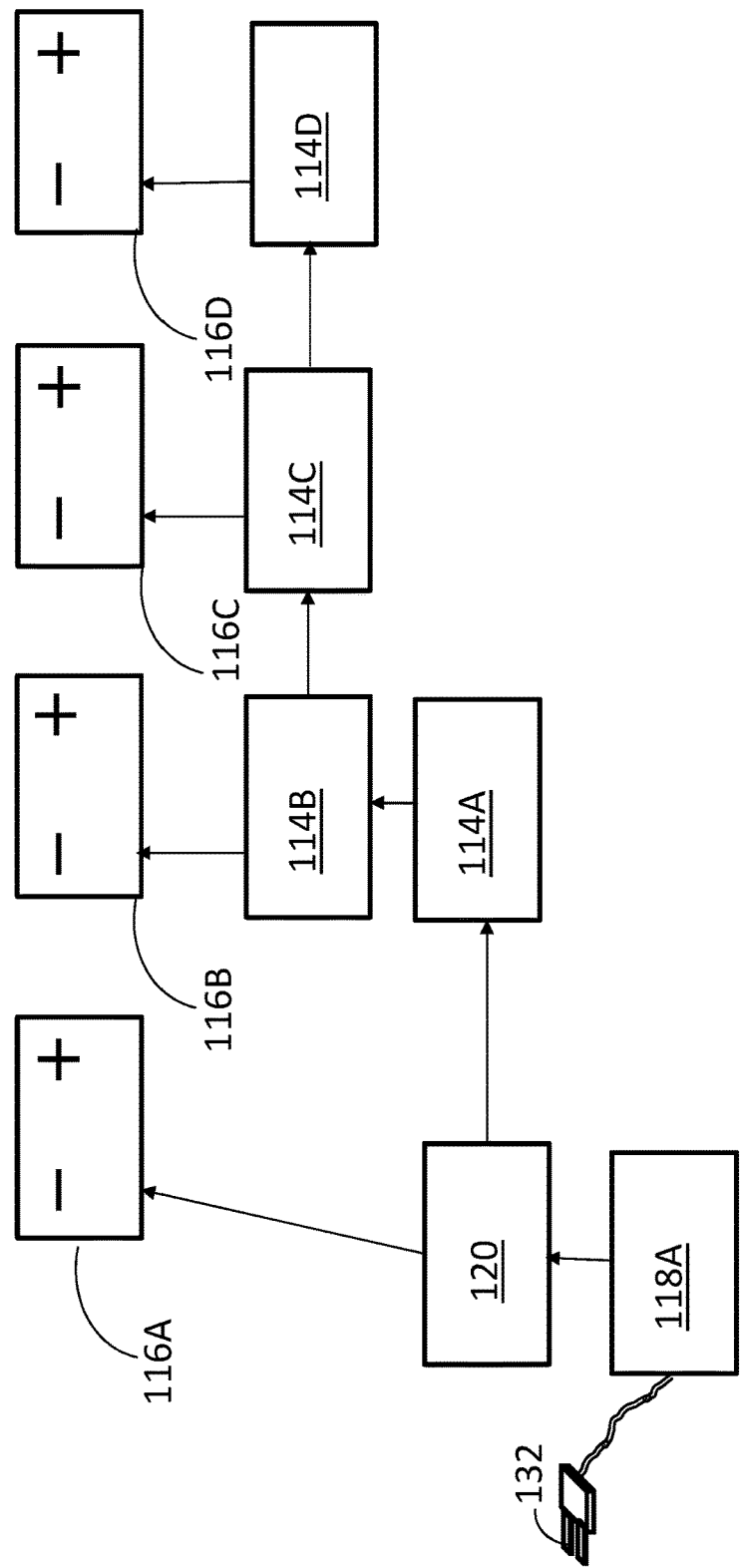
FIG. 5 is a block diagram illustrating elements participating in an exchange of electricity to a plurality of shopping carts, in accordance with some embodiments.

FIG. 5 is a block diagram illustrating elements participating in an exchange of electricity to a plurality of shopping carts, in accordance with some embodiments. The batteries 116A-116D (generally, 116) and docking interfaces 114A-114D (generally, 114) illustrated in FIG. 5 may be part of the shopping carts 10_1 to 10_4 and/or cart 11 illustrated in FIG. 4.

While concepts have been shown and described with reference to specific preferred embodiments, it should be understood by those skilled in the art that various changes in form and detail may be made therein without departing from the spirit and scope as defined by the following claims.

What is claimed is:

1. A shopping cart that generates power, comprising:
a shopping cart body;
a handle coupled to the shopping cart body;
a set of wheels that each rotates about an axle coupled to the shopping cart body;
a power generator that generates a first source of power from a rotational force of the wheels when a user moves the shopping cart;
a voltage regulator that controls the first source of power output from the power generator;
at least one docking interface extending from the shopping cart body and that receives a second source of power from another shopping cart or an alternative current (AC) power source; and
a storage device that stores at least one of the controlled first source of power from at least one of the voltage regulator or the second source of power via the at least one docking interface from the other shopping cart or AC power source, wherein a first region of the handle includes the storage device and a second region of the handle includes an outlet for electronically charging an electronic device removably coupled to the handle, the outlet constructed and arranged to receive an output of the storage device, a portion of the first source of power, a portion of the second source of power, or a combination thereof.

2. The shopping cart of claim 1,
wherein the electronic device is powered by the storage device.

3. The shopping cart of claim 2, wherein the storage device is a battery or capacitor.

4. The shopping cart of claim 2, further comprising a charging port to which the electronic device is electrically coupled for receiving the controlled source of power via the storage device.

5. The shopping cart of claim 2, further comprising a switching device that selects and outputs one of the first and second sources of power between the storage device and one or more power sources.

6. The shopping cart of claim 5, wherein when the power source provides external power, then the switch forms a circuit, wherein the storage device receive powers, instead of receiving power from the power generator.

7. The shopping cart of claim 5, wherein the switch forms a circuit when the power generator generates power.

8. The shopping cart of claim 5, wherein the switching device regulates power levels in shopping carts coupled to the shopping cart in a daisy chain configuration.

9. The shopping cart of claim 1, further comprising a charging port to which the electronic device is electrically coupled for receiving the controlled power directly from the voltage regulator.

10. The shopping cart of claim 1, wherein the charging port includes a universal serial bus (USB) port.

11. The shopping cart of claim 1 wherein the at least one docking interface includes a docking connector that is daisy-chained to one or more docking connectors of neighboring shopping carts for providing the controlled power to storage devices of the neighboring shopping carts using an external power source.

12. The shopping cart of claim 1, wherein the electronic device includes a display screen attached to the shopping cart.

13. The shopping cart of claim 1, wherein the electronic device includes a smartphone that is charged when coupled to a USB port receiving the controlled power.

14. A method for generating power using a shopping cart, comprising:
coupling a power generator to a shopping cart body;
moving the shopping cart so that a set of wheels rotatably affixed to the shopping cart body rotate;
generating a first source of power from a rotational force of the wheels when the wheels rotate;
controlling the first source of power output from the power generator; and
receiving by at least one docking interface extending from the shopping cart body a second source of power from another shopping cart or an alternative current (AC) power source; and
storing by a storage device at least one of the controlled first source of power from at least one of the power generator or the second source of power via the at least one docking interface from the other shopping cart or the AC power source, wherein a first region of the handle includes the storage device and a second region of the handle includes an outlet for electronically charging an electronic device removably coupled to the handle, the outlet constructed and arranged to receive an output of the storage device, a portion of the first source of power, a portion of the second source of power, or a combination thereof.

15. A shopping cart, comprising:
a shopping cart body;
a handle coupled to the shopping cart body;
a set of wheels that each rotates about an axle coupled to the shopping cart body;
a power generator that generates a first source of power from a rotational force of the wheels when a user moves the shopping cart;
at least one docking interface extending from the shopping cart body and that receives a second source of power from another shopping cart or an alternative current (AC) power source; and
a storage device that stores at least one of the controlled first source of power from at least one of the voltage regulator or the second source of power via the at least one docking interface from the other shopping cart or AC power source, wherein a first region of the handle includes the storage device and a second region of the handle includes an outlet for electronically charging an electronic device removably coupled to the handle, the outlet constructed and arranged to receive an output of the storage device, a portion of the first source of power, a portion of the second source of power, or a combination thereof.

16. The shopping cart of claim 15, wherein the storage device includes a positive connection point and a negative connection point that form an electrical connection with a storage device of another shopping cart coupled to the shopping cart in a daisy-chain configuration.

17. The shopping cart of claim 10, wherein the at least one docking interface includes a first docking interfaces 114 for receiving power from another shopping cart upstream from the shopping cart and a second docking interface for outputting power to another shopping cart downstream from the shopping cart.

18. The shopping cart of claim 10, wherein a third region of the handle includes a connector plug for connecting to the AC power source, and for providing a third source of power to the storage device.

* * * * *